United States Patent
Na (10) Patent No.: US 7,492,427 B2
(45) Date of Patent: Feb. 17, 2009

(54) TFT SUBSTRATE AND LIQUID CRYSTAL DISPLAY DEVICE HAVING THE SAME COMPRISING PATTERNS DISPOSED AT DIFFERENT HEIGHTS

(75) Inventor: Byoung-Sun Na, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/124,941

(22) Filed: May 21, 2008

(65) Prior Publication Data
US 2008/0239186 A1    Oct. 2, 2008

Related U.S. Application Data

(63) Continuation of application No. 11/210,132, filed on Aug. 22, 2005, now Pat. No. 7,388,638.

(30) Foreign Application Priority Data
Aug. 23, 2004    (KR) ............................... 2004-66468

(51) Int. Cl.
*G02F 1/1333* (2006.01)
(52) U.S. Cl. ........................... 349/138; 349/123; 349/43
(58) Field of Classification Search ................. 349/138, 349/123, 38, 96, 143, 113, 114
See application file for complete search history.

(56) References Cited

U.S. PATENT DOCUMENTS

| 6,768,530 B2 | 7/2004 | Matsuyama et al. |
| 6,788,363 B2 | 9/2004 | Liu et al. |

*Primary Examiner*—Thoi V Duong
(74) *Attorney, Agent, or Firm*—MacPherson Kwok Chen & Heid LLP (57) ABSTRACT

An LCD device includes a first substrate having a first base substrate, patterns disposed at different heights with respect to the first base substrate, and an insulation layer formed on the first base substrate and the patterns. The insulation layer has raised portions corresponding to the patterns. A side of the raised portions forms an inclination angle of no more than about 45° when a height of the raised portions is more than about 3000 angstroms, the side of the raised portions forms an inclination angle of no more than about 50° when a height of the raised portions is in a range of about 2000 angstroms to about 3000 angstroms, and the side of the raised portions forms an inclination angle of no more than about 90° when a height of the raised portions is more than about 2000 angstroms. Therefore, light leakage may be minimized.

15 Claims, 6 Drawing Sheets

TFT SUBSTRATE AND LIQUID CRYSTAL DISPLAY DEVICE HAVING THE SAME COMPRISING PATTERNS DISPOSED AT DIFFERENT HEIGHTS

CROSS-REFERENCE TO RELATED APPLICATIONS

This application is a continuation of U.S. patent application Ser. No. 11/210,132 filed Aug. 22, 2005, now U.S. Pat. No. 7,388,638, which application relies for priority upon Korean Patent Application No. 2004-66468 filed on Aug. 23, 2004, the contents of which are herein incorporated by reference in their entirety.

BACKGROUND

1. Field of the Invention

The present invention relates to a TFT substrate and a display device having the TFT substrate. More particularly, the present invention relates to a TFT substrate and a liquid crystal display device having the TFT substrate.

2. Description of the Related Art

A liquid crystal display (LCD) device includes a color filter substrate, a thin film transistor (TFT) substrate and a liquid crystal layer. The color filter substrate includes a color filter layer and a common electrode. The TFT substrate includes a TFT and a pixel electrode that is electrically connected to the TFT. The liquid crystal layer is disposed between the TFT substrate and the color filter substrate. When a data voltage is applied to the pixel electrode, an electric field is generated between the pixel electrode and the common electrode to alter an arrangement of liquid crystal molecules of the liquid crystal layer. As a result, an optical transmissivity is altered to display an image.

When a contrast ratio of the LCD device is high, the LCD device displays a clear image. Therefore, it would be desirable to improve the contrast ratio for LCD devices.

SUMMARY OF THE INVENTION

In accordance with the present invention, a TFT substrate capable of enhancing a contrast ratio by reducing contrast ratio deterioration due to a stepped portion is provided.

In accordance with the present invention, a liquid crystal display device having the above TFT substrate is also provided.

In an exemplary TFT substrate according to the present invention, the TFT substrate includes a substrate, a plurality of gate lines, a plurality of data lines, a plurality of pixel electrodes, a protection layer and a pattern. The gate lines are formed on the substrate and extend in a first direction. The data lines are formed on the substrate and extend in a second direction that is substantially perpendicular to the first direction. Each of the pixel electrodes is electrically connected to a TFT that is also electrically connected to a selected gate line and a selected data line. The protection layer is formed on the substrate such that the protection layer covers the gate lines and the data lines. The pattern is disposed in a pixel region of the substrate to induce a stepped portion of the protection layer. The pixel region is defined by adjacent gate lines and adjacent data lines. A longitudinal direction of the pattern forms an angle of about 30 degrees to about 60 degrees with respect to one of the first and second directions. A side of the pattern forms an inclination angle of no more than about 45 degrees when a thickness of the pattern is more than about 3000 angstroms. The side of the pattern forms an inclination angle of no more than about 50 degrees when a thickness of the pattern is in a range of about 2000 angstroms to about 3000 angstroms. The side of the pattern forms an inclination angle of no more than about 90 degrees when a thickness of the pattern is less than about 2000 angstroms.

In an exemplary LCD device according to the present invention, the LCD device includes an upper substrate, a polarization layer, a lower substrate and a liquid crystal layer. The polarization plate has a transmission axis. The lower substrate faces the upper substrate, and is disposed on the polarization plate. The lower substrate includes a plurality of gate lines, a plurality of data lines, a plurality of pixel electrodes, a protection layer and a pattern. The gate lines are formed on the substrate and extend in a first direction. The data lines are formed on the substrate and extend in a second direction that is substantially perpendicular to the first direction. Each of the pixel electrodes is electrically connected to a TFT that is also electrically connected to a selected gate line and a selected data line. The protection layer is formed on the substrate such that the protection layer covers the gate lines and the data lines. The pattern is disposed in a pixel region of the substrate to induce a stepped portion of the protection layer. The pixel region is defined by adjacent gate lines and adjacent data lines. A longitudinal direction of the pattern forms an angle of about 30 degrees to about 60 degrees with respect to one of the first and second directions. A side of the pattern forms an inclination angle of no more than about 45 degrees when a thickness of the pattern is more than about 3000 angstroms. The side of the pattern forms an inclination angle of no more than about 50 degrees when a thickness of the pattern is in a range of about 2000 angstroms to about 3000 angstroms. The side of the pattern forms an inclination angle of no more than about 90 degrees when a thickness of the pattern is less than about 2000 angstroms. The liquid crystal layer is disposed between the upper and lower substrates.

In another exemplary LCD device according to the present invention, the LCD device includes a first substrate, a second substrate, a liquid crystal layer and a voltage applying part. The first substrate has a first base substrate, a plurality of patterns disposed at different height with respect to the first base substrate, and an insulation layer formed on the first base substrate. The insulation layer has a plurality of raised portions by covering the patterns. The second substrate faces the first substrate. The liquid crystal layer is disposed between the first and second substrates. The voltage applying part generates electric fields passing through the liquid crystal layer. A side of the raised portions forms an inclination angle of no more than about 45 degrees when a height of the raised portions is more than about 3000 angstroms, the side of the raised portions forms an inclination angle of no more than about 50 degrees when a height of the raised portions is in a range of about 2000 angstroms to about 3000 angstroms, and the side of the raised portions forms an inclination angle of no more than about 90 degrees when a height of the raised portions is less than about 2000 angstroms.

When a pattern (for example, a protruding portion) disposed in the pixel region induces a stepped portion of an alignment film, a longitudinal direction of the patterns forms an angle of about 30 degrees to about 60 degrees with respect to the transmission axis of the polarizing plate. The pattern satisfies the above-mentioned relation between thickness and inclination angle, and as a result, a light leakage is minimized.

BRIEF DESCRIPTION OF THE DRAWINGS

The above and other features and advantages of the present invention will become more apparent by describing in detail exemplary embodiments thereof with reference to the accompanying drawings, in which.

DESCRIPTION OF THE EMBODIMENTS

When patterns being disposed in a pixel region and inducing a stepped portion forms an angle of about 30 degrees to about 60 degrees, liquid crystal molecules that makes contact with the stepped portion are not vertically erected, so that light is leaked through the stepped portion to lower a contrast ratio. According to the present invention, a condition of the patterns for reducing the patterns.

It should be understood that the exemplary embodiments of the present invention described below may be varied and modified in many different ways without departing from the inventive principles disclosed herein, and the scope of the present invention is therefore not limited to these particular embodiments. Rather, these embodiments are provided so that this disclosure will be thorough and complete, and will fully convey the concept of the invention to those skilled in the art by way of example and not of limitation.

Hereinafter, the embodiments of the present invention will be described in detail with reference to the accompanied drawings. It is noted that various changes, substitutions and alterations can be made herein without departing from the spirit and scope of the invention as defined by embodiments that will be described below. The embodiments are only examples for showing the spirit of the present invention to a person skilled in the art. In the figures, a thickness of layers is exaggerated in order to improve clarity. The term "disposed on" means "disposed over". In other words, another structure may be disposed therebetween. The term "disposed directly on" means that no other structures are disposed therebetween.

Figure 1:
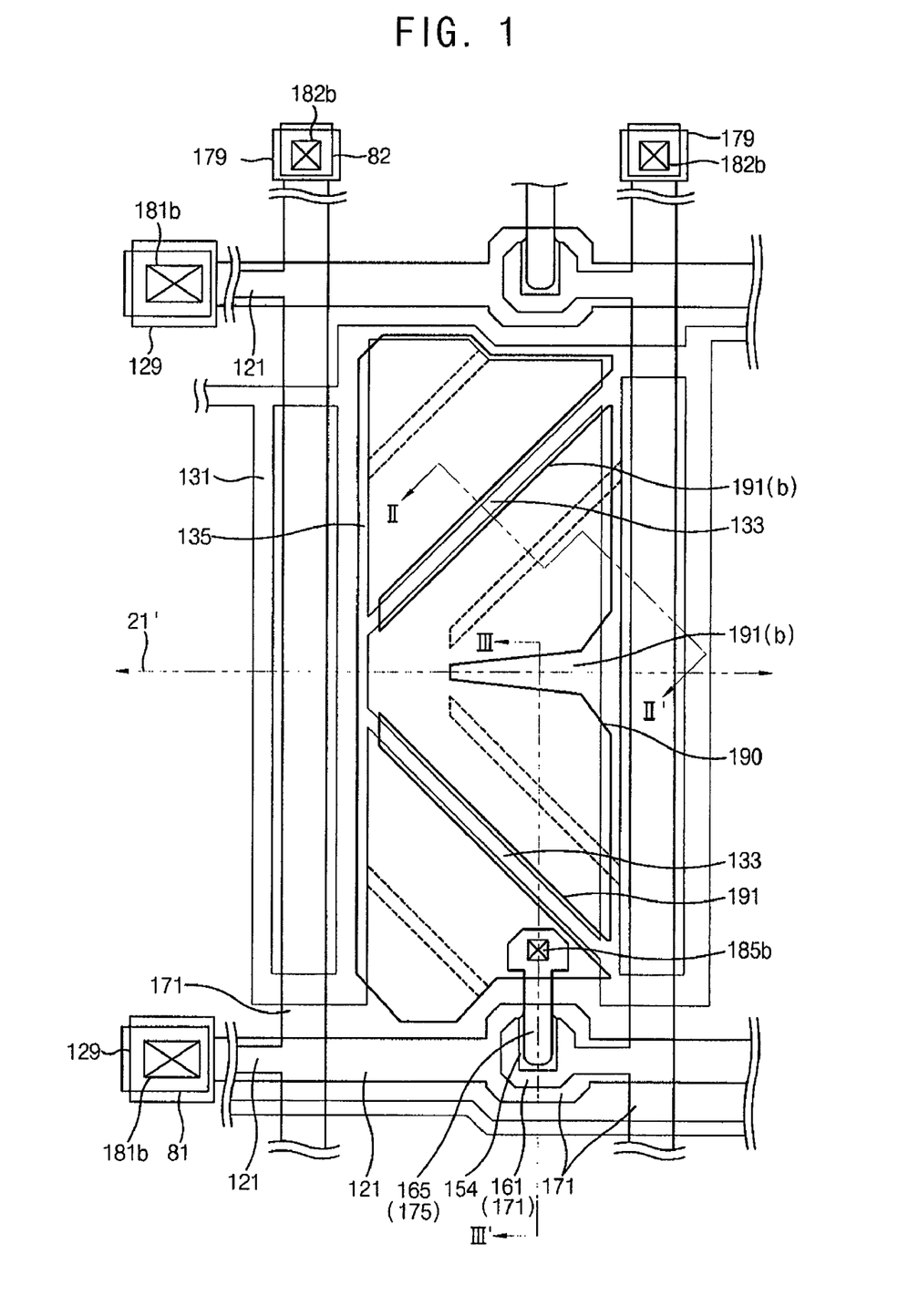
FIG. 1 is a layout illustrating a TFT substrate of an LCD according to a first exemplary embodiment of the present invention.
Figure 2:
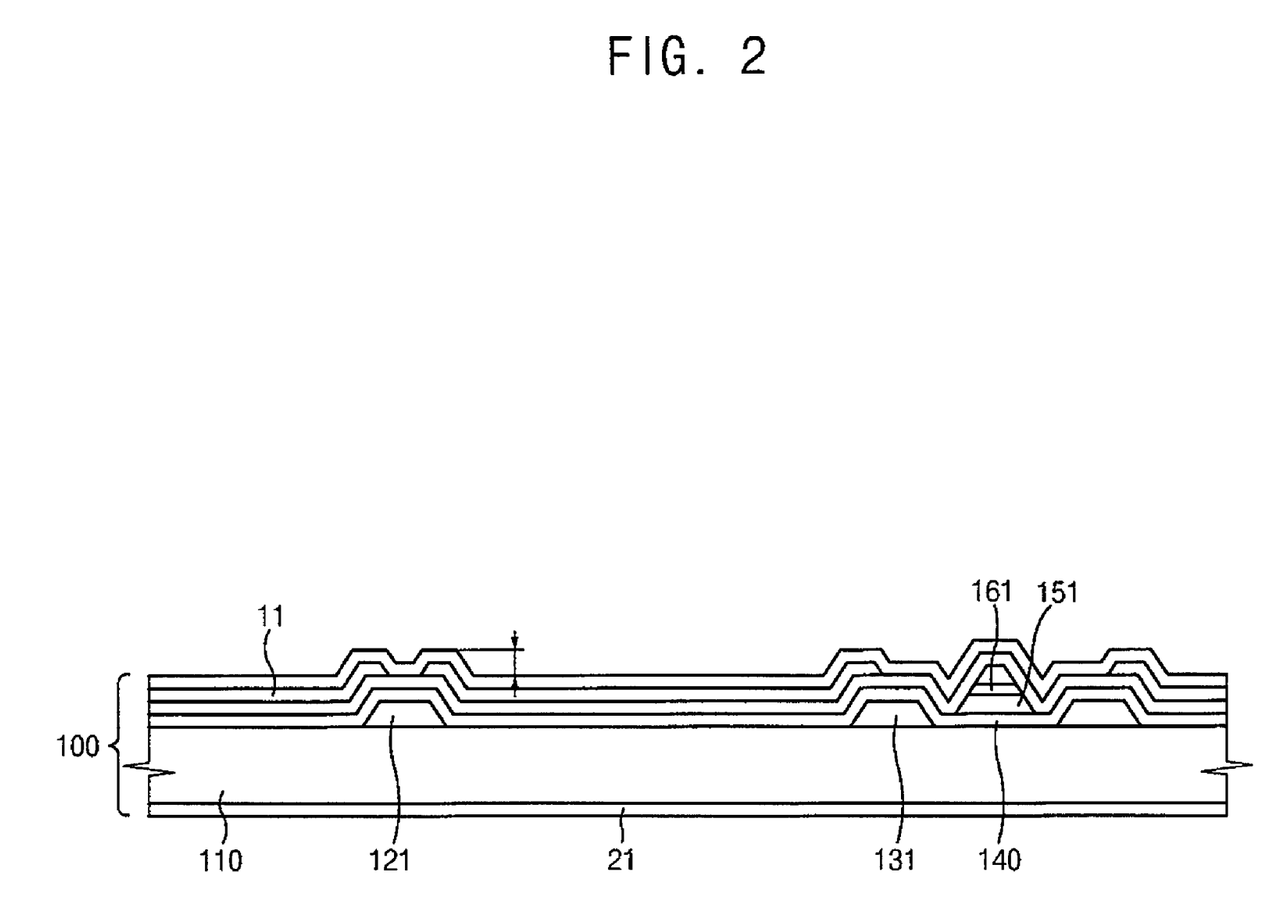
FIG. 2 is a cross-sectional view taken along a line II-II' in FIG. 1.

FIG. 1 is a layout illustrating a TFT substrate of an LCD according to a first exemplary embodiment of the present invention. FIG. 2 is a cross-sectional view taken along a line II-II' in FIG. 1, and FIG. 3 is a cross-sectional view taken along a line III-III' in FIG. 1.

Figure 3:
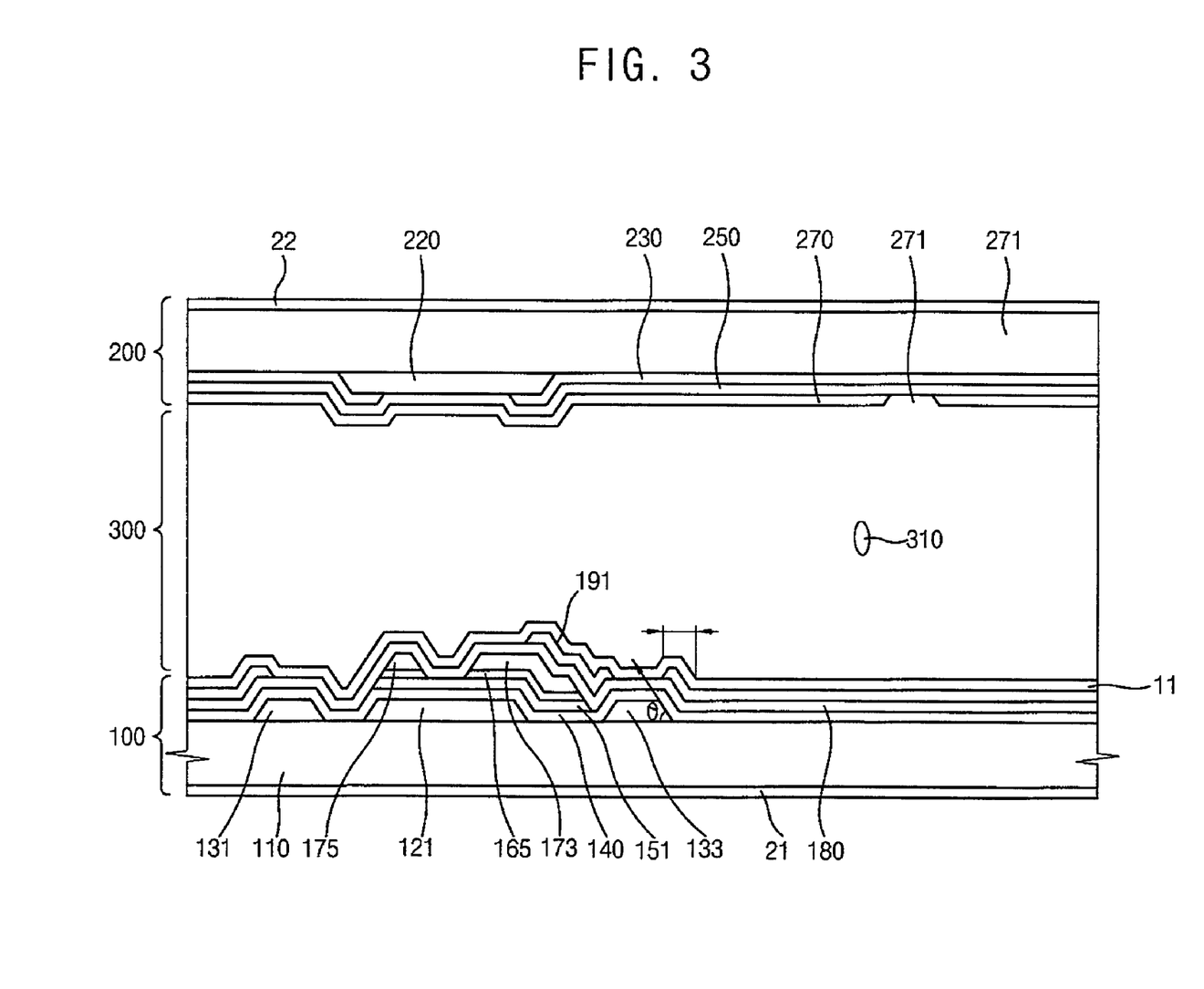
FIG. 3 is a cross-sectional view taken along a line III-III' in FIG. 1.

Referring to FIGS. 1, 2 and 3, a liquid crystal display (LCD) device according to the present embodiment includes a thin film transistor (TFT) substrate 100, a color filter substrate 200 facing the TFT substrate 100, and a liquid crystal layer 300 disposed between the TFT substrate 100 and the color filter substrate 200. Liquid crystal molecules 310 of the liquid crystal layer 300 are arranged such that a longitudinal direction of the liquid crystal molecules is substantially perpendicular to the TFT substrate 100 and the color filter substrate 200.

The TFT substrate 100 and the color filter substrate 200 include a first alignment layer 11 and optionally a second alignment layer (not shown) in order to arrange the liquid crystal molecules 310 in the longitudinal direction.

A plurality of gate lines 121 and a plurality of storage electrode lines 131 are formed on a first insulation substrate 110.

The gate line 121 transfers a gate signal, and a portion of the gate line 121 corresponds to a gate electrode. An end portion 129 of the gate line 121 is enlarged to form the gate electrode, and the gate line 121 is electrically connected to an external device through the end portion 129. When a gate driving circuit is mounted directly on the first insulation substrate 110, the end portion 129 of the gate line 121 is connected to an output terminal of the gate driving circuit.

The storage electrode lines 131 are formed such that the storage electrode lines 131 are substantially parallel with the gate line 121. Alternatively, the storage electrode lines 131 are formed substantially parallel with data lines 171 (as shown in FIG. 1). The storage electrode line 131 includes a storage electrode 135. The storage electrode 135 includes a protruding portion 133. A longitudinal direction of the protruding portion 133 forms an angle of about 45 degrees with respect to a longitudinal direction of the storage electrode lines 131. A voltage applied to the storage electrode 135 is substantially the same as a reference voltage applied to a common electrode 270 of the color filter substrate 200.

The gate line 121 and the storage electrode line 131 have a single layered structure as shown in FIGS. 2 and 3. Alternatively, the gate line 121 and the storage electrode line 131 may have a multi-layered structure. For example, the gate line 121 and the storage electrode line 131 may include a lower layer (not shown) and an upper layer (not shown). The lower and upper layers may have different physical characteristics. The upper layers of the gate line 121 and the storage electrode line 131 may comprise a metal having a relatively low electric resistivity, such as aluminum, aluminum alloy, etc. The lower layer may comprise a material having a relatively high adhesive force to indium tin oxide (ITO), such as molybdenum (Mo), molybdenum alloy, chromium (Cr), etc. For example, the lower layer may comprise chromium (Cr) and the upper layer may comprise aluminum neodymium alloy (AlNd).

A first polarizing layer 21 is disposed under the first insulation substrate 110. The first polarizing layer 21 has a transmission axis 21' that is disposed substantially parallel with the gate line 121. The storage electrode 135 includes the protruding portion 133 protruded such that a longitudinal direction of the protruding portion 133 forms an angle of about 45 degrees with respect to a longitudinal direction of the transmission axis 21'.

The protruding portion 133 induces a stepped portion at a pixel region for displaying an image when the layers are formed on the protruding portion 133. In other words, due to the formation of the protruding portion 133 on the substrate 110, a surface of the pixel region is not planar. Therefore, the liquid crystal molecules 310 that are disposed at the stepped portion are inclined. In other words, the liquid crystal molecules 310 disposed on a flat region are vertically arranged, but the liquid crystal molecules 310 disposed at the stepped portion are not vertically arranged, so that light leaks through the liquid crystal layers 310 disposed at the stepped portion. Therefore, the resulting a contrast ratio of the display device is lowered.

Hereinafter, a stepped portion condition for reducing light leakage will be explained. In an experiment, amount of light leakage was measured by varying a thickness and an inclination of the protruding portion 133. In order to reduce light leakage, a thickness of the protruding portion and an inclination of the protruding portion were adjusted. According to results of the experiment, an inclination of the protruding portion 133 was adjusted according to a thickness of the protruding portion 133. The inclination of the protruding portions 133 were set in cases when the thickness of the protruding portion 133 was no thicker than about 2000 angstroms, when the thickness of the protruding portion 133 was in a range from about 2000 angstroms to about 3000 angstroms, and when the thickness of the protruding portion was thicker than about 3000 angstroms, respectively.

Table 1 below shows a portion of results of the experiment.

TABLE 1

| Thickness (Angstrom) | Inclination θ (Degrees) | Light leakage | Contrast ratio acceptable? |
|---|---|---|---|
| 3000 | 90 | 0.056 | No |
| 2000 | 90 | 0.0279 | Yes |
| 1000 | 90 | 0.0012 | Yes |
| 3000 | 45 | 0.0154 | Yes |
| 2000 | 45 | 0.0066 | Yes |
| 1000 | 45 | 0.0018 | Yes |
| 3000 | 22.5 | 0.0024 | Yes |

In an embodiment in which the protruding portion has a thickness greater than about 3000 angstroms and has a longitudinal direction forming an angle of about 30 degrees to about 60 degrees with respect to the transmission axis 21' of the first polarizing layer 21, the inclination angle of the protruding portion is substantially equal to or less than about 45 degrees. In an embodiment in which the protruding portion has a thickness in the range of about 2000 angstroms to about 3000 angstroms and has a longitudinal direction forming an angle of about 30 degrees to about 60 degrees with respect to the transmission axis 21' of the first polarizing layer 21, the inclination angle of the protruding portion is substantially equal to or less than about 50 degrees. In an embodiment in which the protruding portion has a thickness less than about 2000 angstroms and has a longitudinal direction forming an angle of about 30 degrees to about 60 degrees with respect to the transmission axis 21' of the first polarizing layer 21, the inclination angle of the protruding portion is substantially equal to or less than about 90 degrees.

That is, when a protruding portion has a longitudinal direction forming an angle of about 30 degrees to about 60 degrees with respect to the transmission axis 21' of the first polarizing layer 21, and has an inclination angle substantially equal to or less than about 90 degrees, an allowable thickness of the protruding portion is substantially equal to or less than about 2000 angstroms. When the protruding portion has a longitudinal direction forming an angle of about 30 degrees to about 60 degrees with respect to the transmission axis 21' of the first polarizing layer 21, and has an inclination angle substantially equal to or less than about 50 degrees, an allowable thickness of the protruding portion is substantially equal to or less than about 3000 angstroms. When the protruding portion has a longitudinal direction forming an angle of about 30 degrees to about 60 degrees with respect to the transmission axis 21' of the first polarizing layer 21, and has an inclination angle substantially equal to or less than about 45 degrees, a thickness more than about 3000 angstroms is allowable.

The protruding portion 133 induces stepped portions of the alignment film 11 that make contact with liquid crystal molecules of the liquid crystal layer 300. Therefore, the same logic is applied when the 'protruding portion' is replaced by the 'stepped portions of the alignment film' in the above explanation.

Electrical resistivity decreases as a thickness of the storage electrode increases. However, when the inclination of the protruding portion 133 that protrudes from the storage electrode satisfies the inclination condition described above, the light leakage is minimized.

In FIG. 1, an opening portion of a pixel electrode 190 is disposed over the protruding portion 133, so that the pixel electrode 190 does not overlap with the protruding portion 133. Alternatively, even when the protruding portion 133 overlaps with the pixel electrode 190 to generate a storage capacitance, the above-mentioned condition is not changed.

The protruding portion 133 and the gate electrode 190 are formed from the same metal layer during the same manufacturing process, so that the protruding portion 133 is optically opaque like the gate electrode 190. The protruding portion 133 is disposed in the pixel region (or display region), so that reducing a width of the protruding portion 133 is preferable. A width of the protruding portion 133 is, preferably, no wider than about 10 μm. According to the present embodiment, the protruding portion 133 has a width of about 7 μm.

Inclination of the gate line 121 and the storage electrode line 131 are substantially the same as that of the protruding portion 133.

A gate insulation layer 140 is formed on the first insulation substrate 110 having the gate line 131, the storage electrode line 131 and the protruding portion 133 formed thereon. The gate insulation layer 140 comprises silicon nitride (SiNx) as an exemplary embodiment.

A semiconductor layer 151 comprising, for example, amorphous silicon (a-Si), is formed on the gate insulation layer 140. The semiconductor layer 151 extends substantially parallel with the data line 171, and overlaps with the data line 171. A portion 154 of the semiconductor layer 151 extends toward the gate electrode 124. A width of the semiconductor layer 151 is increased at a region where the gate line 121 and the storage electrode line 131 are merged.

Ohmic contact layers 161 are formed on the semiconductor layer 151. The ohmic contact layers 161 comprise n-type dopant in amorphous silicon (n+a-Si). The ohmic contact layers 161 are disposed over the portion 154 of the semiconductor layer 151.

The sides of the semiconductor layer 151 and the ohmic contact layers 161 are inclined to have an inclination angle of about 30 degrees to about 80 degrees with respect to the substrate 110.

A plurality of data lines 171 and a plurality of drain electrodes 175 are formed on the gate insulation layer 140 and the ohmic contact layers 161, respectively.

The data lines 171 extend such that a longitudinal direction of the data lines 171 is substantially perpendicular to a longitudinal direction of the gate line 121 and the data lines 171 are substantially parallel with the storage electrode line 131. The data lines 171 transmit data voltages. The data lines 171 extend in a straight line. Alternatively, when one pixel has a chevron shape having a bent portion, the data line 171 may be bent along an edge portion of the pixel.

The drain electrode 175 extends toward the storage electrode 135 such that the drain electrode 175 overlaps with the storage electrode 135. A source electrode 173 protrudes from the data line 171. The gate electrode 124, the source electrode 173 and the drain electrode 175 form a thin film transistor TFT. A channel layer is formed at the portion 154 between the source electrode 173 and the drain electrode 175. An end portion 179 of the data line 171 has a wider width than other portions of the data line 171 in order to be easily connected to an external circuit.

The data line 171 has a single layered structure. Alternatively, the data line 171 may have a multi-layered structure. For example, the data line 171 may include a lower layer (not shown) and an upper layer (not shown). The lower and upper layers may have different physical characteristics. The upper layer of the data line 171 may comprise a metal having a relatively low electric resistivity, such as aluminum, aluminum alloy, etc. The lower layer may comprise a material having a relatively high adhesive force to indium tin oxide (ITO), such as molybdenum (Mo), molybdenum alloy such as molybdenum tungsten (MoW), chromium (Cr), etc. For example, the lower layer may comprise chromium (Cr) and the upper layer may comprise aluminum neodymium alloy (AlNd). Alternatively, the data line 171 may have a triple-layered structure of molybdenum or molybdenum alloy/aluminum or aluminum alloy/molybdenum or molybdenum alloy. Molybdenum nitride, molybdenum neodymium, etc. may be used for the molybdenum alloy.

The ohmic contact layers 161 disposed between the semiconductor layer 151, and the source and drain electrodes 173 and 175 lower a contact resistivity. The semiconductor layer 151 has a portion that is not covered by the data line 171 and the drain electrode 175, but a majority of the semiconductor layer 151 has substantially the same as or wider width than a width of the data line 171.

A protection layer 180 is formed on the first insulation substrate 110 such that the protection layer 180 covers the semiconductor layer 151 exposed between the source and drain electrodes 173 and 175, and the data line 171. The protection layer 180 comprises, for example, silicon nitride.

The protection layer 180 includes a contact hole 185$b$ exposing a portion of the drain electrode 175, a contact hole 182$b$ exposing an end portion 179 of the data line 171, and a contact hole 181$b$. A portion of the gate insulation layer 140, which corresponds to the contact hole 181$b$, is removed, so that an end portion 129 of the gate line 121 is exposed through the contact hole 181$b$.

A side face of the contact holes 181$b$, 182$b$ and 185$b$ has, for example, an inclination of about 30 degrees to about 85 degrees with respect to the substrate 110.

The contact holes 181$b$, 182$b$ and 185$b$ may comprise various cross-sectional shapes such as a polygon, a circle, etc. when viewed from a plan view perspective. The contact holes 181$b$, 182$b$ and 185$b$ may have, e.g., a cross-sectional area of about 0.5 μm×15 μm to about 2 μm×60 μm.

The upper layer of the end portion 129 of the gate line 121, the end portion 179 of the data line 171, and the drain electrode 175, exposed by the contact holes 181$b$, 182$b$, and 185$b$, respectively, are removed. In detail, the upper layer including aluminum or aluminum alloy is removed in order to enhance the connection to a conductor layer, as will be described in greater detail below.

The pixel electrode 190 comprising an optically transparent and electrically conductive material such as indium tin oxide (ITO), indium zinc oxide (IZO), etc., contact supporting members 81 and 82, and a subsidiary electrode 197 are formed on the protection layer 180.

The pixel electrode 190 is disposed in the pixel region surrounded by the gate lines 121 and the data lines 171. The pixel electrode 190 is electrically connected to the drain electrode 175 through the contact hole 185$b$.

The contact supporting members 81 and 82 are electrically connected to the end portion 129 of the gate line 129, and the end portion 179 of the data line 171 through the contact holes 182$b$ and 181$b$, respectively. The contact supporting members 81 and 82 enhance an electrical contact stability, and protect the end portions 129 and 179 of the gate and data lines 121 and 171, respectively. Here, the contact supporting members 81 and 82 are optional. When the gate line 121 and the data line 171 are electrically connected to output terminals of a gate driving circuit and a data driving circuit formed on the first insulation substrate 110, the contact supporting members 81 and 82 are not required.

The pixel electrode 190 includes the opening portions 191$a$ and 191$b$. A first virtual line extending along the opening portion 191$a$ meets a second virtual line extending along the opening portion 191$b$ to form an angle of about 90 degrees. A width of the opening portions 191$a$ and 191$b$ is no wider than about 10 μm. The pixel electrode 190 overlaps a portion of the storage electrode 135. In other words, a portion of the storage electrode 135 is not covered by the pixel electrode 190, so that the storage electrode 135 blocks light leakage between the pixel electrodes 190 adjacent to each other.

The pixel electrode 190 comprises an optically transparent and electrically conductive material such as ITO, IZO, etc. Alternatively, the pixel electrode 190 may comprise a metal that is opaque, when the LCD device corresponds to a reflective type LCD device. The contact supporting members 81 and 82 may comprise the same material as that of the pixel electrode 190. Alternatively, the contact supporting members 81 and 82 may comprise a different material from that of the pixel electrode 190.

The color filter substrate 200 comprises a second insulating substrate 210, a light blocking layer 220 and a color filter layer 230. The light blocking layer 220 includes an opening portion disposed over the pixel electrode 190. The color filter layer 230 includes a plurality of red color filters, a plurality of green color filters and a plurality of blue color filters. Each of the red, green and blue color filters are formed on the second insulation layer 210 exposed though the opening portions of the light blocking layer 220.

The color filter substrate 200 further comprises an over-coating layer 250 formed on the color filter layer 230 and the light blocking layer 220. The over-coating layer 250 comprises, for example, an organic material.

The color filter substrate 200 further comprises a common electrode 270 formed on the over-coating layer 250. The common electrode 270 comprises an optically transparent and electrically conductive material such as ITO, IZO, etc. The common electrode 270 includes an opening portion 271 that is positioned to be substantially parallel and aligned with the opening portion 191$a$ of the pixel electrode 190.

The opening portion 271 controls a direction of the liquid crystal molecules 310. The opening portion 271 has a width of, e.g., about 9 μm to about 12 μm. Instead of the opening portions 271 of the common electrode 270, an upper protrusion may be formed on the common electrode 270. Instead of the opening portion 191$a$ of the pixel electrode 190, a lower protrusion may be formed on pixel electrode 190. When the upper protruding portion is formed on the common electrode 270, the common electrode 270 may be directly formed on the color filter layer 230. The upper and lower protrusions may be formed at substantially the same position of the opening portions 271 or the opening portion 191$a$.

The first and second polarizing layers 21 and 22 are formed on outer surfaces of the first and second insulation substrates 110 and 210, respectively. One of the first and second polarizing layers 21 and 22 has a light transmission axis that is substantially in parallel with the gate line 121.

The LCD device optionally includes a retardation film for compensating a retardation value of the liquid crystal layer 300.

The liquid crystal layer 300 includes liquid crystal molecules forming a substantially perpendicular angle with respect to the first and second insulation substrates 110 and 210 in a default state. The liquid crystal layer 300 has a negative permittivity anisotropy.

When a reference voltage is applied to the common electrode 270 and a data voltage is applied to the pixel electrode 190, a primary electric field is formed between the common electrode 270 and the pixel electrode 190. The primary electric fields are generated substantially perpendicular to the planar surfaces of the common electrode 270 and the pixel electrode 190. Then, liquid crystal molecules 310 are rearranged such that a direction of the liquid crystal molecules 310 is substantially perpendicular to the primary electric fields. In other words, the liquid crystal molecules 310 are inclined.

The opening portion 271 of the common electrode 270 and the opening portion 191a of the pixel electrode 190 alter the electric fields to form a horizontal component. Therefore, four domains are generated in the pixel region. Two of the domains adjacent to each other have a different inclination angle. Each domain has a width of about 10 μm to about 30 μm.

When the pixel region has a size of smaller than about 100 μm×300 μm, the pixel region includes four domains. When the pixel region has a size of substantially equal to or larger than about 100 μm×300 μm, the pixel region may include four domains or eight domains.

When an inclination angle of the liquid crystal molecules 310 forms an angle of 45 degrees with respect to the transmission axis 21' of the first polarizing layer 21, a maximum luminance may be obtained. According to the present invention, all liquid crystal molecules 310 of each domain are inclined at an angle of about 45 degrees with respect to the gate line 121, and the gate line 121 is substantially perpendicular to or parallel with edges of the first and second insulation substrates 110 and 210. Therefore, when the first polarizing layer 21 is attached on the outer surface of the first insulation substrate 110 such that the transmission axis 21' of the first polarizing layer 21 is substantially perpendicular to or parallel with edges of the first insulation substrate 110, a maximum luminance may be obtained.

Figure 4:
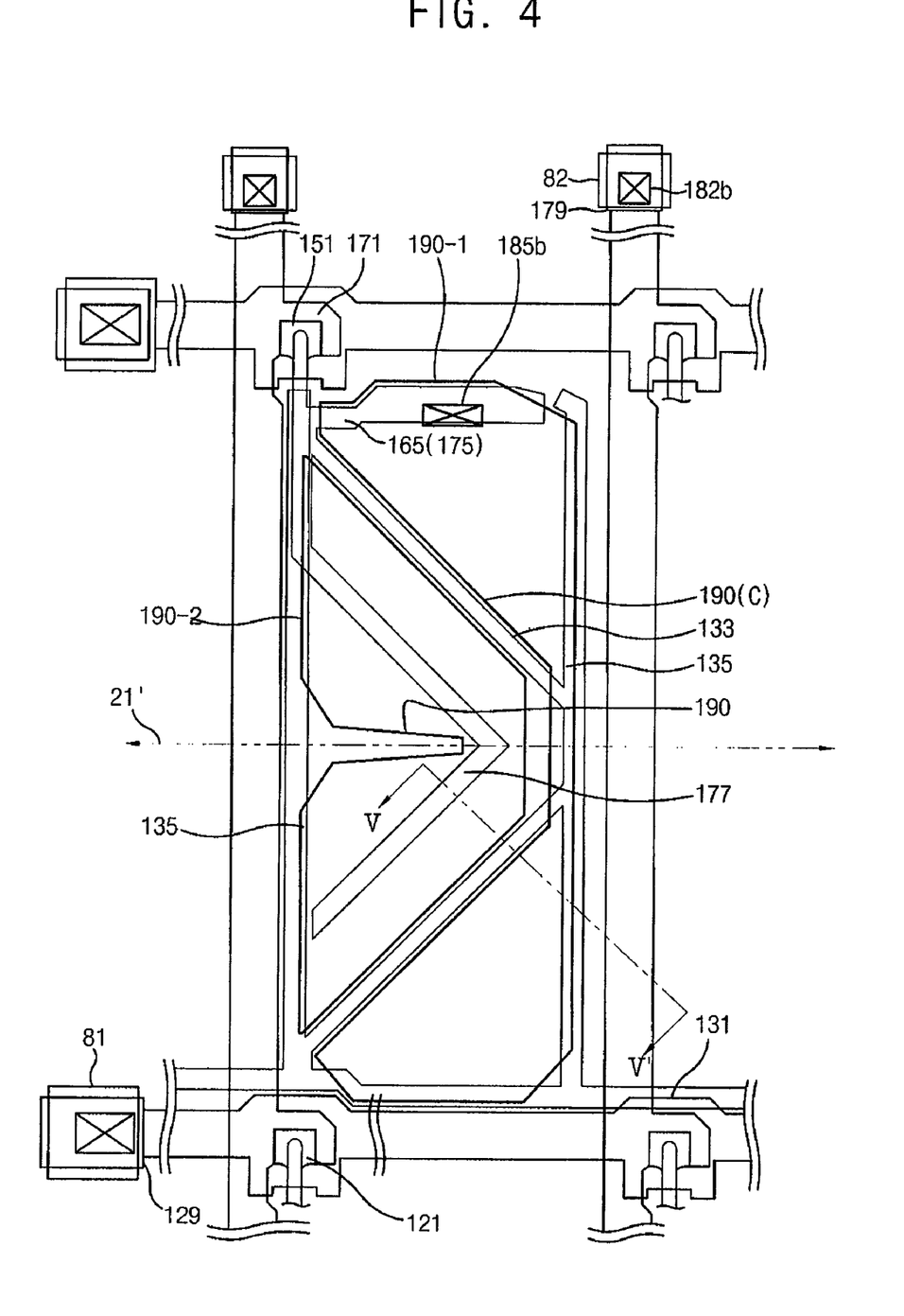
FIG. 4 is a layout illustrating a TFT substrate according to a second exemplary embodiment of the present invention.
Figure 5:
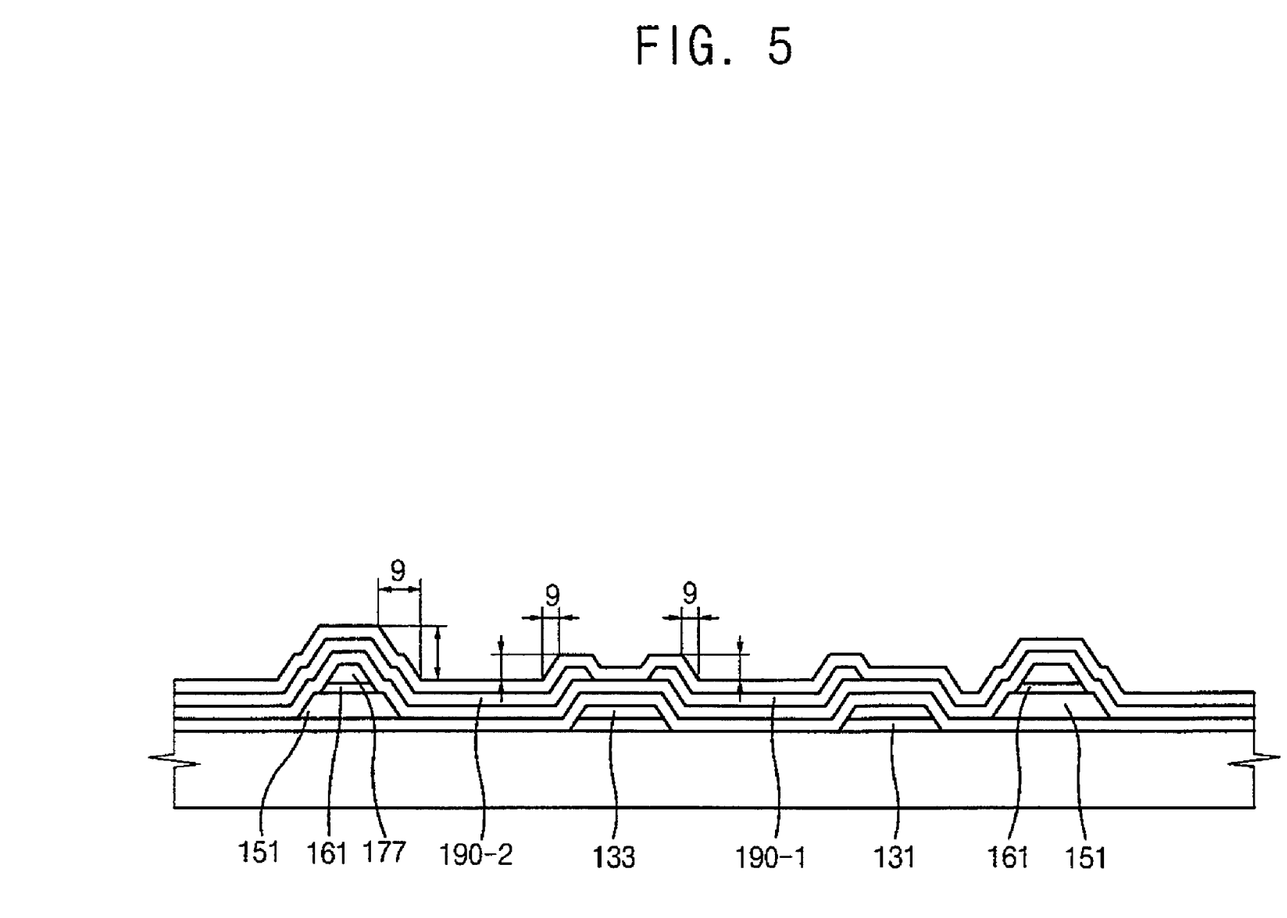
FIG. 5 is a cross-sectional view taken along a line V-V' in FIG. 4.

FIG. 4 is a layout illustrating a TFT substrate according to a second exemplary embodiment of the present invention. FIG. 5 is a cross-sectional view taken along a line V-V' in FIG. 4, and FIG. 6 is a circuit diagram of the LCD device in FIG. 4.

Figure 6:
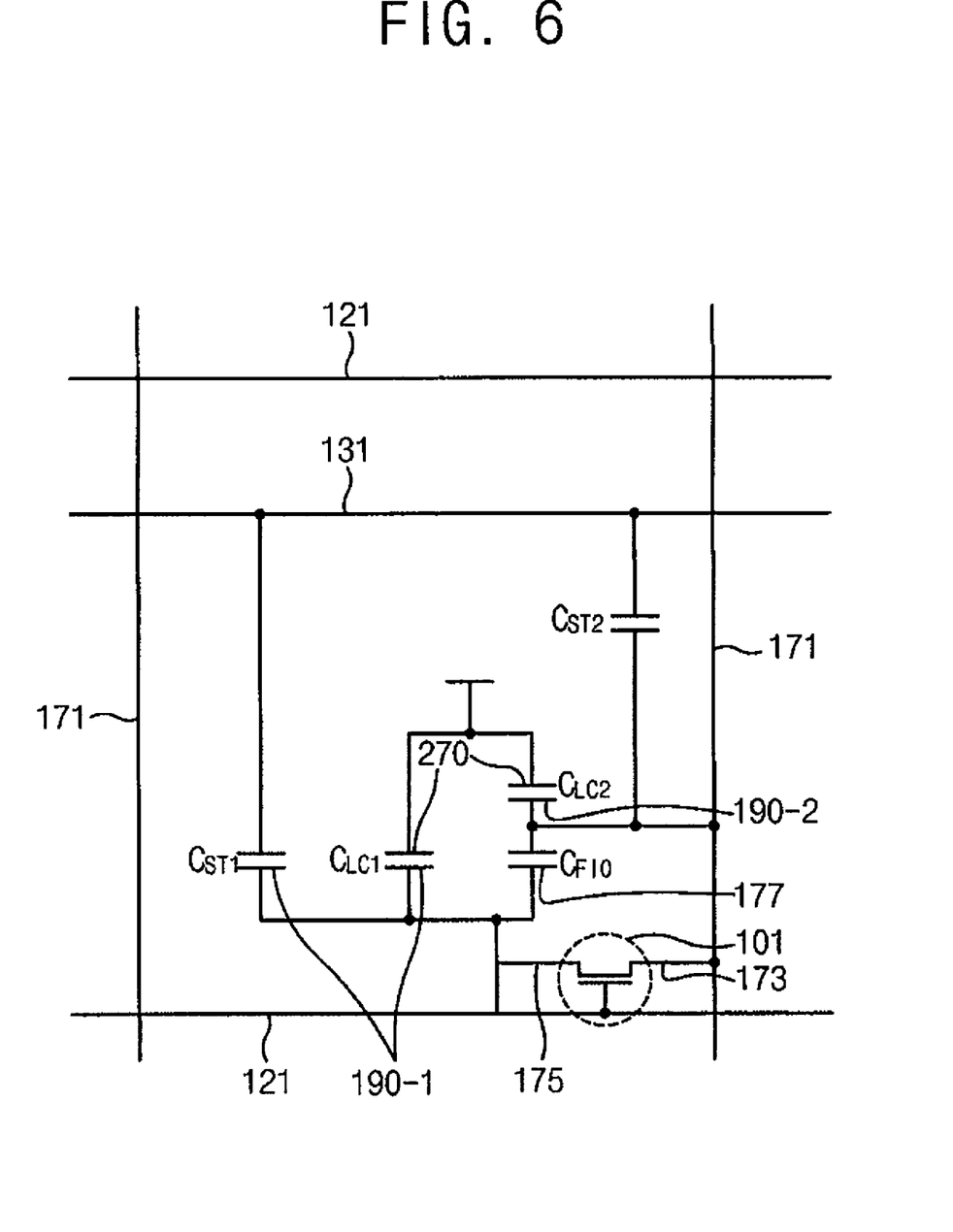
FIG. 6 is a circuit diagram of the LCD device in FIG. 4.

Referring to FIGS. 4, 5 and 6, a TFT 101 is formed in a pixel region. The TFT 101 is electrically connected to the gate line 121 and the data line 171. A first liquid crystal capacitor $C_{LC1}$ is formed, the first liquid crystal capacitor $C_{LC1}$ being defined by the pixel electrode 190-1 that is electrically connected to the drain electrode 175 of the TFT 101, a common electrode 270, and liquid crystal layer 300 disposed between the pixel electrode 190-1 and the common electrode 270. A second liquid crystal capacitor $C_{LC2}$ is formed, the second liquid crystal capacitor $C_{LC2}$ defined by the pixel electrode 190-2 that is electrically connected to the drain electrode 175 of the TFT 101, a common electrode 270 and liquid crystal layer 300 disposed between the pixel electrode 190-1 and the common electrode 270.

When a voltage of about 7V is applied to the pixel electrode 190-1 and a voltage of about 5V is applied to the common electrode 270, a voltage difference of about 2V is applied between the pixel electrode 190-1 and the common electrode 270. However, a voltage difference less than about 2V is applied between the floating pixel electrode 190-2 and the common electrode 270, because the storage capacitor $C_{FT0}$ is electrically connected in series with the second liquid crystal capacitor $C_{LC2}$. That is, by applying a voltage of about 7V, two different voltages may be applied to the first and second liquid crystal capacitors $C_{LC1}$ and $C_{LC2}$, respectively. Therefore, a first light that passes through the first liquid crystal capacitors $C_{LC1}$ and a second light that passes through the second liquid crystal capacitors $C_{LC2}$ interfere with each other. This interface enhances the display quality.

Additionally, a storage capacitor $C_{st1}$ for reducing voltage drop caused by a leakage current flowing between the storage electrode line 131 and the pixel electrode 190-1, and a storage capacitor $C_{st2}$ that is electrically connected to the storage electrode line 131 and the floating pixel electrode 190-2 are formed. The pixel electrode 190-1 and the floating pixel electrode 190-2 cover a portion of the data line 171. In detail, when a side of the data line 171 is spaced apart from a side of the storage electrode line 131 by at least about 1 μm, the storage electrode line 131 having a uniform voltage applied thereto blocks light.

The edges of the pixel electrode 190-1 and the floating pixel electrode 190-2 are aligned at an angle of about 90 degrees, and the protruding portions extending along the edges form an angle of 45 degrees with respect to the transmission axis 21'.

In embodiments in which the protruding portion has a longitudinal direction forming an angle of about 30 degrees to about 60 degrees with respect to the transmission axis 21' of the first polarizing layer 21, and an inclination angle substantially equal to or less than about 45 degrees, the thickness of the protruding portion is thicker than about 3000 angstroms. In embodiments in which the protruding portion has a longitudinal direction forming an angle of about 30 degrees to about 60 degrees with respect to the transmission axis 21' of the first polarizing layer 21, and an inclination angle substantially equal to or less than about 50 degrees, the thickness of the protruding portion is in a range of about 2000 angstroms to about 3000 angstroms. In embodiments in which the protruding portion has a longitudinal direction forming an angle of about 30 degrees to about 60 degrees with respect to the transmission axis 21' of the first polarizing layer 21, and an inclination angle substantially equal to or less than about 90 degrees, the thickness of the protruding portion is thicker than about 3000 angstroms.

In other words, when the protruding portion has a longitudinal direction forming an angle of about 30 degrees to about 60 degrees with respect to the transmission axis 21' of the first polarizing layer 21, and an inclination angle substantially equal to or less than about 90 degrees, an allowable thickness of the protruding portion is substantially equal to or less than about 2000 angstroms. When the protruding portion has a longitudinal direction forming an angle of about 30 degrees to about 60 degrees with respect to the transmission axis 21' of the first polarizing layer 21, and an inclination angle substantially equal to or less than about 50 degrees, an allowable thickness of the protruding portion is substantially equal to or less than about 3000 angstroms. When the protruding portion that has a longitudinal direction forming an angle of about 30 degrees to about 60 degrees with respect to the transmission axis 21' of the first polarizing layer 21, and an inclination angle substantially equal to or less than about 45 degrees, a thickness more than about 3000 angstroms is allowable.

As described above, a pattern (for example, a protruding portion) disposed in the pixel region induces a stepped portion of an alignment film and a longitudinal direction of the pattern forms an angle of about 30 degrees to about 60 degrees with respect to the transmission axis of the polarizing plate. If the pattern satisfies the above-mentioned relationship between the thickness and inclination angle, the light leakage may be minimized.

Hereinbefore, the present invention was explained with reference to a VA mode LCD device. Alternatively, the present invention may be applied to a TN mode LCD device, or other mode LCD devices.

Having described the exemplary embodiments of the present invention, it is noted that various changes, substitutions and alterations can be made herein without departing from the spirit and scope of the invention as defined by appended claims.

What is claimed is:

1. A thin film transistor (TFT) substrate, comprising:
a substrate;
a plurality of gate lines formed on the substrate, the gate lines extending in a first direction;
a plurality of data lines formed on the substrate, the data lines extending in a second direction that is substantially perpendicular to the first direction;
a plurality of pixel electrodes, each of the pixel electrodes being electrically connected to a TFT that is electrically connected to a selected gate line and a selected data line;
a protection layer formed on the substrate such that the protection layer covers the gate lines and data lines; and
a pattern disposed in a pixel region of the substrate to induce a stepped portion of the protection layer, a longitudinal direction of the pattern forming an angle of about 30 degrees to about 60 degrees with respect to one of the first and second directions;
wherein if a thickness of the pattern is thicker than about 3000 angstroms, then a side of the protection layer on the pattern forms an inclination angle of no more than about 45 degrees, if a thickness of the pattern is in a range of about 2000 angstroms to about 3000 angstroms, then the side of the protection layer on the pattern forms an inclination angle of no more than about 50 degrees, and if a thickness of the pattern is less than about 2000 angstroms, then the side of the protection layer on the pattern forms an inclination angle of no more than about 90 degrees.

2. The TFT substrate of claim 1, wherein the pixel electrode comprises at least one opening portion disposed over the pattern.

3. The TFT substrate of claim 2, wherein a width of the pattern is substantially smaller than a width of the opening portion of the pixel electrode.

4. The TFT substrate of claim 1, wherein the data line comprises a bent portion, so that the pixel region has a chevron-shape.

5. The TFT substrate of claim 1, wherein the protection layer comprises silicon nitride.

6. The TFT substrate of claim 1, wherein the pattern comprises at least one layer including aluminum or aluminum alloy.

7. The TFT substrate of claim 1, wherein the pattern comprises molybdenum, molybdenum alloy or chromium.

8. The TFT substrate of claim 1, wherein the pattern and the data lines are formed from a single layer.

9. The TFT substrate of claim 1, wherein a first voltage is applied to the pattern and the pixel electrode.

10. The TFT substrate of claim 1, further comprising a floating pixel electrode that is electrically isolated from the pixel electrode.

11. The TFT substrate of claim 1, further comprising an alignment layer on the protection layer, wherein if the thickness of the pattern is thicker than about 3000 angstroms, then a side of the alignment layer on the pattern forms an inclination angle of no more than about 45 degrees, if the thickness of the pattern is in the range of about 2000 angstroms to about 3000 angstroms, then the side of the alignment layer on the pattern forms an inclination angle of no more than about 50 degrees, and if the thickness of the pattern is less than about 2000 angstroms, then the side of the alignment layer on the pattern forms an inclination angle of no more than about 90 degrees.

12. A thin film transistor (TFT) substrate, comprising:
a substrate;
a plurality of gate lines formed on the substrate, the gate lines extending in a first direction;
a plurality of data lines formed on the substrate, the data lines extending in a second direction that is substantially perpendicular to the first direction;
a plurality of pixel electrodes, each of the pixel electrodes being electrically connected to a TFT that is electrically connected to a selected gate line and a selected data line;
an alignment layer formed on the substrate such that the alignment layer covers the gate lines and data lines; and
a pattern disposed in a pixel region of the substrate to induce a stepped portion of the alignment layer, a longitudinal direction of the pattern forming an angle of about 30 degrees to about 60 degrees with respect to one of the first and second directions;
wherein if a thickness of the pattern is thicker than about 3000 angstroms, then a side of the alignment layer on the pattern forms an inclination angle of no more than about 45 degrees, if a thickness of the pattern is in a range of about 2000 angstroms to about 3000 angstroms, then the side of the alignment layer on the pattern forms an inclination angle of no more than about 50 degrees, and if a thickness of the pattern is less than about 2000 angstroms, then the side of the alignment layer on the pattern forms an inclination angle of no more than about 90 degrees.

13. A liquid crystal display (LCD) device comprising:
an upper substrate;
a polarization plate having a transmission axis;
a lower substrate facing the upper substrate and disposed on the polarization plate, the lower substrate comprising:
a plurality of gate lines extending in a first direction;
a plurality of data lines extending in a second direction that is substantially perpendicular to the first direction;
a plurality of pixel electrodes, each of the pixel electrodes being electrically connected to a TFT that is electrically connected to a selected gate line and a selected data line;
a protection layer formed on the substrate such that the protection layer covers the gate lines and the data lines; and
a pattern disposed in a pixel region of the substrate to induce a stepped portion of the protection layer, a longitudinal direction of the pattern forming an angle of about 30 degrees to about 60 degrees with respect to the polarization axis;
wherein if a thickness of the pattern is thicker than about 3000 angstroms, a side of the protection layer on the pattern forms an inclination angle of no more than about 45 degrees, if a thickness of the pattern is in a range of about 2000 angstroms to about 3000 angstroms, then the side of the protection layer on the pattern forms an inclination angle of no more than about 50 degrees, and if a thickness of the pattern is less than about 2000 angstroms, then the side of the protection layer on the pattern forming an inclination angle of no more than about 90 degrees; and a liquid crystal layer disposed between the upper and lower substrates.

14. The LCD device of claim 13, further comprising an alignment layer on the protection layer, wherein if the thickness of the pattern is thicker than about 3000 angstroms, then a side of the alignment layer on the pattern forms an inclination angle of no more than about 45 degrees, if the thickness of the pattern is in the range of about 2000 angstroms to about 3000 angstroms, then the side of the alignment layer on the pattern forms an inclination angle of no more than about 50 degrees, and if the thickness of the pattern is less than about 2000 angstroms, then the side of the alignment layer on the pattern forms an inclination angle of no more than about 90 degrees.

15. A liquid crystal display (LCD) device comprising:

an upper substrate;

a polarization plate having a transmission axis;

a lower substrate facing the upper substrate and disposed on the polarization plate, the lower substrate comprising:

a plurality of gate lines extending in a first direction;

a plurality of data lines extending in a second direction that is substantially perpendicular to the first direction;

a plurality of pixel electrodes, each of the pixel electrodes being electrically connected to a TFT that is electrically connected to a selected gate line and a selected data line;

an alignment layer formed on the substrate such that the alignment layer covers the gate lines and the data lines; and a pattern disposed in a pixel region of the substrate to induce a stepped portion of the alignment layer, a longitudinal direction of the pattern forming an angle of about 30 degrees to about 60 degrees with respect to the polarization axis;

wherein if a thickness of the pattern is thicker than about 3000 angstroms, a side of the alignment layer on the pattern forms an inclination angle of no more than about 45 degrees, if a thickness of the pattern is in a range of about 2000 angstroms to about 3000 angstroms, then the side of the alignment layer on the pattern forms an inclination angle of no more than about 50 degrees, and if a thickness of the pattern is less than about 2000 angstroms, then the side of the alignment layer on the pattern forming an inclination angle of no more than about 90 degrees; and a liquid crystal layer disposed between the upper and lower substrates.

* * * * *